US00RE47046E

(19) United States
(12) Reissued Patent
Martinsson et al.

(10) Patent Number: US RE47,046 E
(45) Date of Reissued Patent: Sep. 18, 2018

(54) FLIP UP CAP

(71) Applicant: HUSQVARNA AB, Huskvarna (SE)

(72) Inventors: Pär Martinsson, Jönköping (SE); Stefan Stark, Huskvarna (SE)

(73) Assignee: HUSQVARNA AB, Huskvarna (SE)

(21) Appl. No.: 15/457,090

(22) Filed: Mar. 13, 2017

Related U.S. Patent Documents

Reissue of:
(64) Patent No.: 9,260,008
Issued: Feb. 16, 2016
Appl. No.: 13/580,504
PCT Filed: Feb. 23, 2010
PCT No.: PCT/SE2010/050207
§ 371 (c)(1),
(2) Date: Aug. 22, 2012
PCT Pub. No.: WO2011/105937
PCT Pub. Date: Sep. 1, 2011

(51) Int. Cl.
*B60K 15/04* (2006.01)

(52) U.S. Cl.
CPC .. *B60K 15/0406* (2013.01); *B60K 2015/0445* (2013.01)

(58) Field of Classification Search
CPC . B06K 15/0406; Y10S 220/33; Y10S 220/32; B27B 17/00; B27B 17/14
USPC ..... 220/212.5, 304; 215/220, 214, 223, 244, 215/305, 336, 342
See application file for complete search history.

(56) References Cited

U.S. PATENT DOCUMENTS 1,689,979 A * 10/1928 Tate ..... B60K 15/0409 220/210
1,818,608 A * 8/1931 Chafkin ..... F16L 55/1018 220/254.5
3,612,338 A 10/1971 Ekman
3,820,680 A * 6/1974 Friend ..... 220/288
(Continued)

FOREIGN PATENT DOCUMENTS

DE 697929 C 10/1940
EP 1607294 A1 12/2005
(Continued)

OTHER PUBLICATIONS

International Search Report and Written Opinion of PCT/SE2010/050207 dated Oct. 27, 2010.
(Continued)

*Primary Examiner* — Beverly M Flanagan
(74) *Attorney, Agent, or Firm* — McNair Law Firm, P.A.

(57) ABSTRACT

The invention relates to a closure device (2) for closing a refill opening of a tank such as, a fuel tank or a lubricant tank. The closure device includes a body portion (20) for engagement with the refill opening. The closure device (2) further includes a pivotal member (6) provided with a grip portion (3). The grip portion (3) may be switched between a retracted position and a protruding position. In protruding position, the grip portion (3) extends outwardly of the body portion (20) to form a convenient grip to an operator. A holding member (13, 14, 17) may be provided to hold the pivotal member (6) in the protruding position. The holding member (13, 14, 17) may be secured to the pivotal member (6) and to the body portion (20). The closure device (2) may
(Continued)

further comprise a biasing member (11) arranged for urging the pivotal member (6) towards the retracted position.

40 Claims, 4 Drawing Sheets

(56) References Cited

U.S. PATENT DOCUMENTS

| | | | | |
|---|---|---|---|---|
| 4,091,959 | A * | 5/1978 | O'Banion | B60K 15/0406 220/304 |
| 4,099,645 | A | 7/1978 | Muth et al. | |
| 4,124,151 | A | 11/1978 | Hazard | |
| 4,399,928 | A | 8/1983 | Klingler | |
| 4,402,435 | A | 9/1983 | Libit | |
| 4,529,099 | A | 7/1985 | Zerrer | |
| 4,535,910 | A | 8/1985 | Nagashima | |
| 4,567,994 | A | 2/1986 | Hofmann | |
| 5,339,487 | A * | 8/1994 | Kasper | 15/246.2 |
| 5,480,055 | A * | 1/1996 | Harris et al. | 220/203.26 |
| 5,522,143 | A * | 6/1996 | Schliemann et al. | 30/386 |
| 6,079,582 | A | 6/2000 | Nickel et al. | |
| 6,237,797 | B1 | 5/2001 | Hurford | |
| 6,560,879 | B2 * | 5/2003 | Franke et al. | 30/386 |
| 6,745,914 | B2 | 6/2004 | Hagano et al. | |
| 6,877,233 | B1 * | 4/2005 | Franke | 30/386 |
| 6,968,874 | B1 * | 11/2005 | Gabbey | B60K 15/04 141/348 |
| 7,107,689 | B2 * | 9/2006 | Keeton et al. | 30/386 |
| D537,024 | S * | 2/2007 | Shibuta et al. | D12/197 |
| 7,467,736 | B2 | 12/2008 | Delage | |
| 7,588,159 | B2 | 9/2009 | Otsuka | |
| 2003/0098307 | A1 * | 5/2003 | Hagano et al. | 220/303 |
| 2006/0000835 | A1 | 1/2006 | Wikstrom et al. | |
| 2006/0075644 | A1 * | 4/2006 | Keeton et al. | 30/386 |
| 2007/0084069 | A1 | 4/2007 | Guip | |
| 2007/0090113 | A1 * | 4/2007 | Otsuka | 220/304 |
| 2008/0092398 | A1 | 4/2008 | Hurley et al. | |

FOREIGN PATENT DOCUMENTS

| | | | |
|---|---|---|---|
| EP | 2011991 | A2 | 1/2009 |
| GB | 1264263 | A | 2/1972 |
| JP | S55131823 | U | 9/1980 |
| JP | S591890 | Y2 | 1/1984 |
| JP | S596524 | U | 1/1984 |
| JP | S6041339 | U | 3/1985 |
| JP | 2003341706 | A | 12/2003 |
| JP | 2004131145 | A | 4/2004 |
| RU | 2312775 | C1 | 12/2007 |
| RU | 2329081 | C2 | 7/2008 |
| RU | 2363597 | C1 | 8/2009 |
| WO | 2004058360 | A2 | 7/2004 |
| WO | 2008108690 | A1 | 9/2008 |
| WO | 2009063331 | A2 | 5/2009 |

OTHER PUBLICATIONS

Chapter I International Preliminary Report on Patentability of PCT/SE2010/050207 dated Aug. 28, 2012.

* cited by examiner

FLIP UP CAP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to a closure device for a tank such as a fuel tank or a lubricant tank. More particularly, it relates to a closure device for the tank of a portable handheld tool.

BACKGROUND

Internal combustion engines are widely used in a variety of handheld tools such as, but not limited to, chainsaw, hedge trimmer, grass trimmer, blower, mower, and the like. The engine driven handheld tools are provided with a tank such as a fuel tank or a lubricant tank with a refill opening. Typical closure device for the threaded fill opening of the tank may include a threaded cap which is engageable with the corresponding threads in the refill opening. The threaded cap closes off the refill opening tightly with respect to the ambient by tightening the cap in the refill opening.

Most of the conventional closure devices provide an unfavorable grip to an operator. Also, a portion of the cap that protrudes outwardly when the cap is in the closed position is used for gripping by the operator. Moreover, caps with an openable gripping portion are also used in the handheld tools. The openable gripping portion may be opened to provide a better grip to the operator while releasing or tightening of the cap. These caps may be better than the conventional caps, however, they suffer from the problem of unintended opening of the openable gripping portion. The unintended opening of the openable gripping portion may result in breaking of the cap or unintended releasing of the cap.

Therefore, there exists a need for a closure device for a tank such as, but not limited to, a fuel tank or a lubricant tank of the handheld tool. Moreover, there exists a need for the closure device which provides a better grip to an operator while releasing or tightening of a cap.

SUMMARY

In view of the above, it is an objective to solve or at least reduce the problems discussed above. In particular, an objective is to provide a means for closing the refill opening of a tank such as a fuel tank or a lubricant tank of a handheld power tool. The closing means may be opened to provide a convenient grip to an operator.

The objective is achieved by a closure device for closing a refill opening of a tank in a handheld power tool described in claim 1. The closure device comprises a body portion and a pivotal member. The body portion may be arranged for engagement with the refill opening. The body portion also defines a longitudinal axis. The pivotal member may be pivotal about a pivotal axis and pivotally connected to the body portion for movement between a retracted position and a protruding position. The pivotal member includes a grip portion that in the protruding position extends outwardly of the body portion to form a grip. This helps an operator in loosening and tightening of the closure device. The closure device is characterized in that the pivotal member is lockable in the protruding position by means of a holding member, wherein a first part of the holding member is secured to the pivotal member and a second part of the holding member is secured to the body portion. The closure device is further characterized in that it further comprises a biasing member arranged for urging the pivotal member towards the retracted position.

With such a closure device the tightening and loosening of the closure device is facilitated by the protruding grip portion. It is easy to use for the operator even if he or she for instance is wearing gloves, since the grip portion may be locked in the protruding position when the tank is being opened or closed. At the same time, when the pivotal member is released from the lockable protruding position, the biasing member urges the pivotal member towards the retracted position. Thereby, the closure device may provide a smooth outer surface automatically when the pivotal member is not in the protruding position. Also, when operating the power tool, if something, for instance a branch or the like, would hook on to the pivotal member, the pivotal member will be urged towards the retracted position again when the branch let the pivotal member go. If the pivotal member instead would stay in a position separated from the retracted position there would be a risk of the closure device to be damaged, or unintended loosening of the closure device to occur. The body may be provided with threads for engagement with corresponding threads on the refill opening. The body portion and the refill opening may also, in another embodiment, be provided with other engagement means than threads, such as means for a bayonet coupling, snapping means or the like.

According to claim 2, an embodiment is provided wherein the holding member comprises a first fastening member attached to the pivotal member and a second fastening member attached to the body portion. The first and the second fastening members are adapted to engage each other when the pivotal member is in the protruding position.

The fastening members may be arranged for engaging each other when the operator moves the pivotal member to the protruding position. In that way, an amount of torque may be needed to move the pivotal member to the lockable protruding position such that a branch that may hook on to the pivotal member would not be able to move the pivotal member to the lockable protruding position. The fastening members may also provide a strong holding function for the pivotal member in the protruding position when the operator looses or tightens the closure device. The amount of torque needed for releasing the fastening members from each other may be greater than the amount of torque provided by the biasing member when urging the pivotal member towards the retracted position.

In a further embodiment, the holding member may be a resilient member. Thereby, the resilience of the member may set the amount of force needed for moving the pivotal member to the lockable protruding position.

In an embodiment according to claim 4, a threshold position is arranged for the pivotal member between the retracted position and the protruding position, and for a position of the pivotal member between the threshold position and the protruding position, the resilient member urges the pivotal member towards the protruding position.

By urging the pivotal member towards the protruding position the protruding position may easier be reached when moving the pivotal member. The pivotal member is held in the protruding position by the resilient member constantly urging the pivotal member towards the protruding position, until an operator moves the pivotal member passed the threshold position.

In another embodiment, the resilient member may be a spring attached in one end to the pivotal member and in another end to the body portion. In yet another embodiment, the resilient member may be a conical pressure spring.

By providing a spring as the resilient member, the spring may provide the urging function on the pivotal member towards the protruding position when the pivotal member is in a position between the threshold position and the protruding position. When the pivotal member is in the protruding position, the spring may hold the pivotal member in the protruding position by spring force.

In an embodiment according to claim 7, the biasing member is the same as the resilient member, and for a position of the pivotal member between the threshold position and the retracted position, the resilient member urges the pivotal member towards the retracted position.

This may be provided when the resilient member is a spring attached to the pivotal member and the body portion. When the pivotal member is on one side of the threshold position, the spring may urge the pivotal member towards the retracted position. When the pivotal member is on the other side of the threshold position, the spring may urge the pivotal member towards the protruding position and then hold the pivotal member in the protruding position, facilitating the grip for the operator when loosening or tightening the closure device. The construction of the closure device may be simpler and more cost-effective when the same member urges the pivotal member to both the retracted and the protruding position. The location of the threshold position may be set by the design of the spring and the pivotal member. Also the torque needed for moving the pivotal member to or from the protruding position may be set by the spring force.

According to claim 8, an embodiment is provided wherein the pivotal member may be pivotal about or with at least one pin, which at least one pin may be secured to the body portion. In this case the biasing member may be a torsion spring arranged around said at least one pin for urging the pivotal member to return to the retracted position.

The torsion spring may provide the urging function of the pivotal member towards the retracted position when the holding member or the resilient member not provides such urging. Thereby, the pivotal member may always be urged back to the retracted position if moved when not intended to. The torque provided by the torsion spring for urging the pivotal member back to the retracted position is less than the torque needed for moving the pivotal member away from the protruding position.

In a further embodiment, the pivotal member may include a counter portion located on an opposite side of the pivotal axis with respect to the grip portion. A recess portion may also be provided in the body portion for receiving the counter portion when the pivotal member is moved from the retracted position towards the protruding position.

In an embodiment according to claim 10, the counter portion may be arranged in a way that it may be pressed down to assist in moving the pivotal member away from the retracted position. Further, according to claim 11, a part of the counter portion may protrude a distance beyond the surrounding surface of the body portion in the retracted position of the pivotal member.

Thereby, the pivotal member is easy to turn from the retracted position even if the operator for instance is wearing gloves. He or she must not be able to grip the grip portion edge of the pivotal member to get it moving from the retracted position. It is enough to be able to push on the counter portion to lift the grip portion from the retracted position.

In an embodiment according to claim 12, the grip portion may extend a distance A from the pivotal axis and the counter portion may extend at least a distance of 0.25 A, and preferably at least 0.35 A, and even more preferably at least 0.45 A from the pivotal axis.

With such extension of the counter portion, the counter portion may not be too small when the operator needs to push on the counter portion to lift the grip portion of the pivotal member. If the extension of the counter portion is too small, the area of the counter portion surface would be too small for the operator to push, and also the amount force needed to push the counter portion to lift the grip portion would be too large.

In a further embodiment, the pivotal member may include a securing portion that projects into the interior of the body portion for the retracted position of the pivotal member. The resilient member may then be secured to the securing portion of the pivotal member. The resilient member may further be pivotally secured to the securing portion.

To further facilitate the moving of the pivotal member from the retracted position, as well as the gripping of the grip portion when in the protruding position, at least a part of the pivotal member may in one embodiment be provided with a surface structure on a surface of the pivotal member facing away from the body portion. The surface structure may include grooves, recesses, ribs or the like.

BRIEF DESCRIPTION OF THE DRAWINGS

The invention will in the following be described in more detail with reference to the enclosed drawings, wherein.

DESCRIPTION OF EMBODIMENTS

Figure 1:
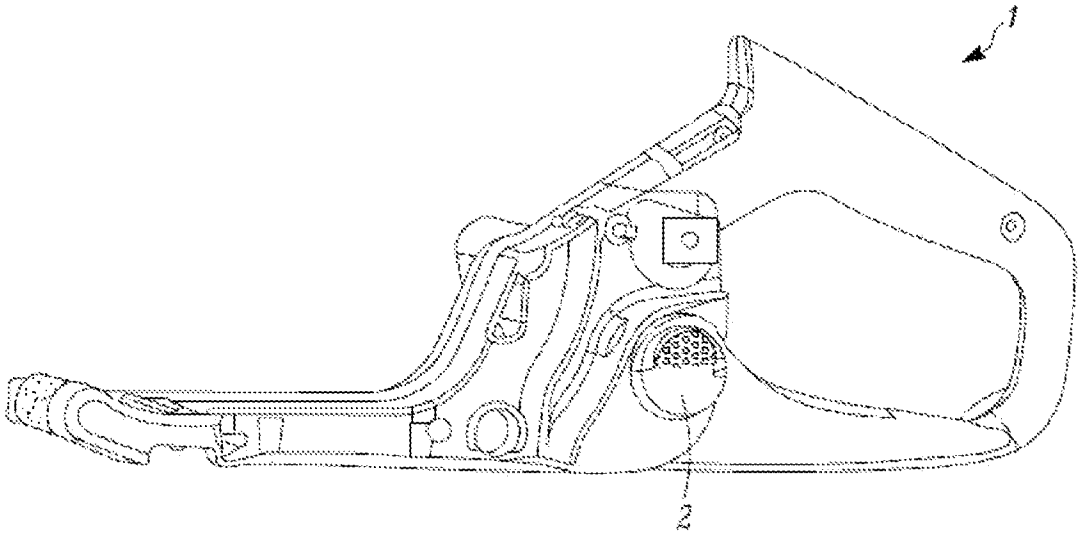
FIG. 1 illustrates a tank with a closure device for a chainsaw, according to an embodiment of the present invention.

The present invention will be described more fully hereinafter with reference to the accompanying drawings, in which preferred embodiments of the invention are shown. This invention may, however, be embodied in many different forms herein; rather, these embodiments are provided so that this disclosure will be thorough and complete, and will fully convey the scope of the invention to those skilled in the art. In the drawings, like numbers refer to like references.

FIG. 1 illustrates a perspective view of a handle part 1, of for instance a chain saw, in accordance with an example embodiment of the present invention. Although the example embodiment is shown to be used in conjunction with the chainsaw, it should be understood that the present invention could be incorporated into any suitable type of portable handheld power tool and is not limited to use in the chainsaw only and, may be incorporated in different types of embodiments. The handle part 1, hereinafter referred to as the "handheld power tool 1", may be used in gardening or forestry applications. The handheld power tool 1 may be driven by an internal combustion engine (not shown). Further, the internal combustion engine may be either a gasoline engine or a diesel engine. In an embodiment of the present invention, a tank may be a fuel tank of the internal combustion engine. The fuel tank may include a refill opening (not shown) with threads for engagement with corresponding threads of a closure device 2. The closure device 2 may be used to close the refill opening in a sealed manner with respect to the ambient by tightening the closure device 2 into the refill opening.

Figure 2:
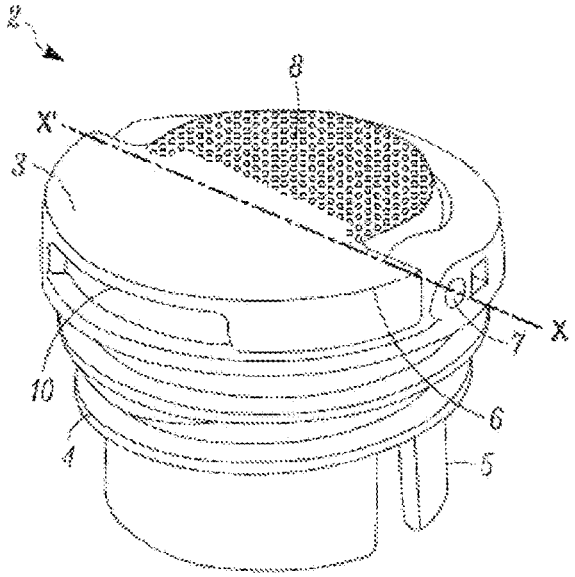
FIG. 2 illustrates a perspective view of the closure device with a grip portion in a retracted position, according to an embodiment of the present invention.

FIG. 2 illustrates a perspective view of the closure device 2. The closure device 2 includes a body portion 20 provided with threads 4 for engagement with corresponding threads of the refill opening. The refill opening may be closed by tightening the body portion 20 of the closure device 2 into the refill opening of the fuel tank of the handheld power tool 1. The closure device 2 has a substantially flat top surface. The closure device 2 further includes a skirt 5 to provide a fluid-tight seal when the closure device 2 is fully engaged into the refill opening.

Referring to FIG. 2, a pivotal member 6 is provided which is pivotal about a pin 7 passing through a pivotal axis XX'. The pivotal member 6 is pivotally connected to the body portion 20 for switching between a retracted position and a protruding position. The pivotal member 6 further includes a grip portion 3 for providing a convenient grip to an operator of the handheld power tool 1. The shape of the grip portion 3 may be semi-circular. However, it will be apparent to a person ordinarily skilled in the art that the grip portion 3 may have any suitable shape.

Figure 4:
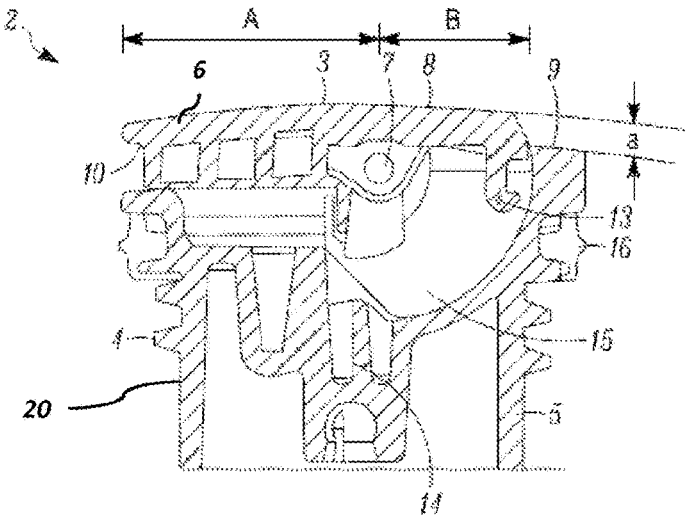
FIG. 4 illustrates a cross section view of the closure device with the grip portion in the retracted position, according to an embodiment of the present invention.

The pivotal member 6 further includes a counter portion 8 located on an opposite side of the pivotal axis XX' with respect to the grip portion 3. The counter portion 8 includes surface structure such as grooves, ribs or recesses on a surface of the pivotal member 6 which is facing away from the body portion 20. Referring to FIG. 2, the counter portion 8 protrudes a distance beyond the surrounding surface of the body portion 20 in a longitudinal direction along a longitudinal axis Y of the body portion 20, in the retracted position of the pivotal member 6. This helps in pushing the counter portion 8 to facilitate the opening of the grip portion 3. The grip portion 3 extends a distance A (as shown in FIG. 4) from the pivotal axis XX' and the counter portion 8 extends a distance B from the pivotal axis XX'. The distance B is at least a distance of 0.25×A from the pivotal axis XX'. As an example, if the distance A is 2 cm, the distance B is at least 0.5 cm. In other embodiments the distance B may be at least a distance of 0.35×A or 0.45×A from the pivotal axis XX'. If then the distance A is 2 cm, the distance B is at least 0.7 cm or 0.9 cm, independent of the extending distance A of the grip portion 3, it is preferred that the counter portion extends at least 0.5 cm from the pivotal axis XX'.

A recess 10 is formed in the periphery of the grip portion 3 as shown in the FIG. 2. The grip portion 3 may be opened by inserting a finger tip into the recess 10. The counter portion 8 may still be pushed down into the closure device 2 in order to assist in moving the pivotal member 6 away from the retracted position. If the operator for instance wears gloves, he or she can push the counter portion 8 in order to move the grip portion 3 away from the retracted position as much to enable grip of the grip portion 3 in the recess 10.

The closure device 2 may further include a resilient member that holds the pivotal member 6 in the protruding position. The resilient member may be secured to the pivotal member 6 and the body portion. In various embodiments of the present invention, the resilient member may be a spring, preferably a pressure spring or a conical pressure spring. The resilient member is explained in conjunction with FIG. 6.

Figure 3:
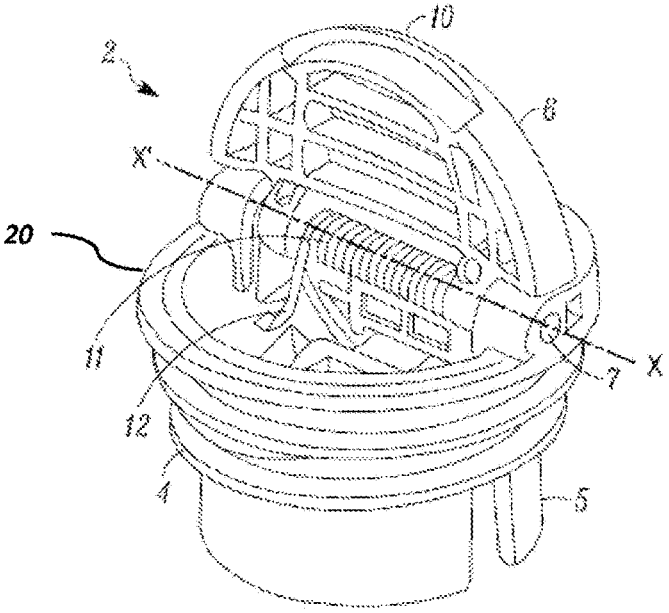
FIG. 3 illustrates a perspective view of the closure device with the grip portion in a protruding position, according to an embodiment of the present invention.

FIG. 3 illustrates a perspective view of the closure device 2 with the grip portion 3 in the protruding position. The closure device 2 includes a biasing member 11 surrounding the pin 7 as shown in the FIG. 3. The first end of the biasing member 11 is secured to the grip portion 3 and the second end 12 of the biasing member 11 is secured to the body portion 20. The biasing member 11 urges the pivotal member 6 towards the retracted position unless the pivotal member 6 is in the protruding position. The biasing member 11 may be a torsion spring arranged around the pin 7 for urging the pivotal member 6 to return to the retracted position. The biasing member 11 may further be a pressure spring or a conical pressure spring. In some embodiments of the present invention, the resilient member and the biasing member 11 may be the same member.

FIG. 4 illustrates a cross section view of the closure device 2 with the grip portion 3 in the retracted position. The closure device 2 includes a pivotal member fastener unit 13 and a body portion fastener unit 14. The pivotal member fastener unit 13 includes one or more fastening members connected with the pivotal member 6 and the body portion fastener unit 14 includes one or more fastening members connected with the body portion 20. Specifically, the fastening members of the pivotal member fastener unit 13 engage with the corresponding members of the body portion fastener unit 14 to hold the pivotal member 6 in the protruding position. In the protruding position, the grip portion 3 of the pivotal member 6 extends outwardly of the body portion 20 to form a grip. The operator may easily loose or tighten the closure device 2 with the help of the grip.

Referring to FIG. 4, the counter portion 8 protrudes a distance a beyond the surrounding surface of the body portion 20 in a longitudinal direction along a longitudinal axis Y of the body portion 20, in the retracted position of the pivotal member 6. Thereby, the pushing of the counter portion 8 to lift the grip portion 3 is facilitated, since the counter portion 8 protrudes beyond the body portion 20. The body portion 20 of the closure device 2 is provided with a recess portion 15 for receiving the counter portion 8. Specifically, the counter portion 8 of the pivotal member 6 moves in the recess portion 15 when the pivotal member 6 moves from the retracted position towards the protruding position.

The closure device 2 also includes a sealing ring 16. The sealing ring 16 may be made of an elastic rubber material and it prevents leakage of for instance fuel when the closure device is mounted in an opening on a tank of a handheld power tool.

Figure 5:
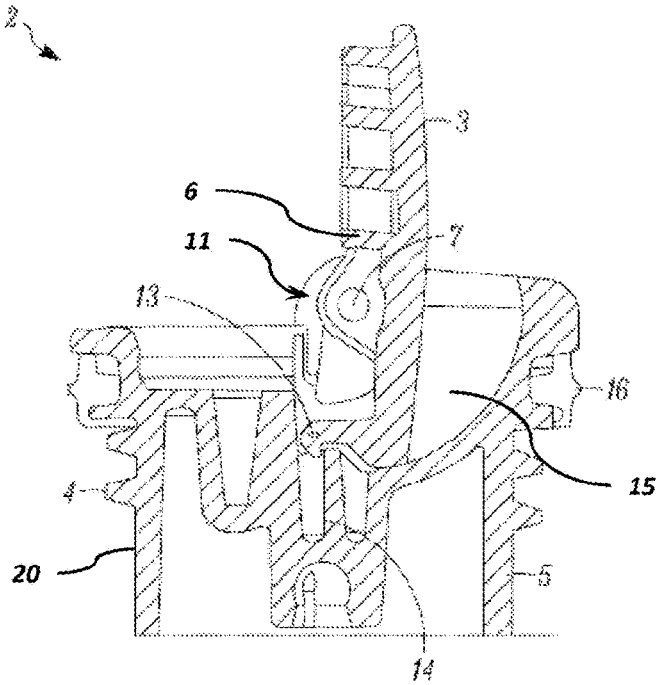
FIG. 5 illustrates a cross section view of the closure device with the grip portion in the protruding position, according to an embodiment of the present invention.

FIG. 5 illustrates a cross section view of the closure device 2 with the grip portion 3 in the protruding position. In the protruding position, the fastening members of the pivotal member fastener unit 13 and the fastening members of the body portion fastener unit 14 form a snap fastening means. The fastener member of the pivotal member fastener unit 13 may be a flexible member and the fastening member of the body portion fastener unit 14 may be a seat portion for holding the flexible member. The fastening member of the body portion fastener unit 14 may be a flexible member and the fastening member of the pivotal member fastener unit 13 may be a seat portion for holding the flexible member. The torque required for releasing the fastening means is greater than the torque exerted by the biasing member 11, such that the pivotal member 6 is held in the protruding position. Thereby, the pivotal member 6 must be released from the protruding position by an operator and may not be released by itself. The torque required for the fastening means to engage to a locking position is also greater than what normally may be caused by a branch or the like that may get hooked to the grip member during operation of the power tool.

Figure 6:
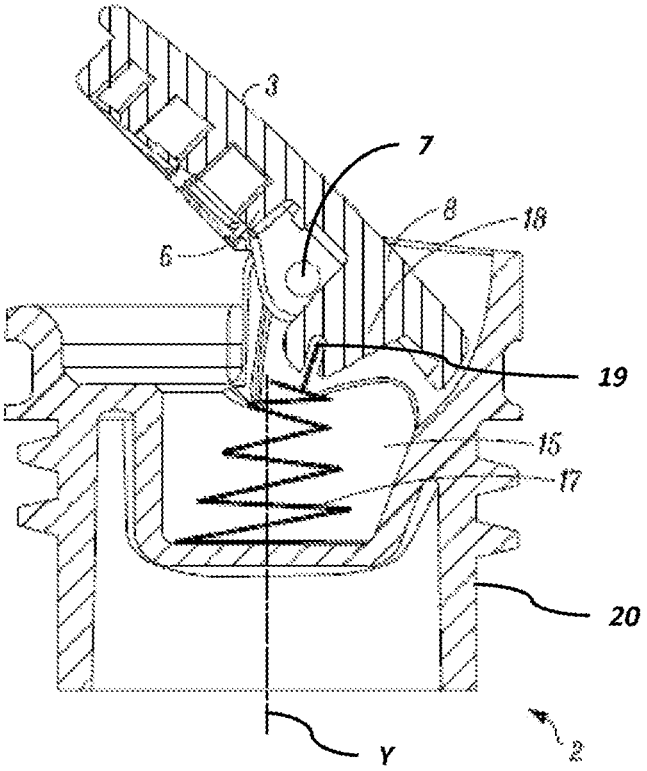
FIG. 6 illustrates a cross section view of the closure device with the grip portion close to a threshold position, according to an embodiment of the present invention.

FIG. 6 shows a cross section view of the closure device 2 with the pivotal member 6 located between the threshold position and the retracted position. The threshold position is arranged between the retracted position and the protruding position of the pivotal member 6. A resilient member 17 can hold the pivotal member 6 in the protruding position. When the pivotal member 6 is between the threshold position and the protruding position, the resilient member 17 urges the pivotal member 6 towards the protruding position. Thus, even a small turning of the pivotal member 6 from the threshold position towards the protruding position urges the pivotal member 6 towards the protruding position. Similarly, if the pivotal member 6 is moved passed the threshold position towards the retracted position, the resilient member 17 will urge the pivotal member 6 towards the retracted position. Thereby, the function of the biasing member 11 is incorporated in the resilient member 17.

The resilient member 17 may be a spring, preferably a pressure spring or a conical pressure spring. A first part of the spring 17 is secured to the bottom of the recess 15 in the body portion 20. A second part of the spring 17 is pivotally secured to a securing portion 18 of the pivotal member 6 as shown in the FIG. 6. The securing portion 18 projects into the interior of the body portion 20 for the retracted position of the pivotal member 6. At the connection point between the spring 17 and the securing portion 18 there is a securing axis 19 at which the spring 17 is pivotally secured to the securing portion 18. The securing axis 19 is parallel to the pivotal pin 7 around which the pivotal member 6 turns. When the pivotal member 6 is in a position between the threshold position and the retracted position, the spring 17 pushes the securing portion 18 and the counter portion 8 upwards at the same side of the pivotal pin 7, to the right in the figure, such that the pivotal member 6 is pushed towards the retracted position.

When the pivotal pin 7 around which the pivotal member turns and the securing axis 19 is in line with a longitudinal centre of the spring 17, then the pivotal member 6 is in the threshold position. At a position of the pivotal member between the threshold position and the protruding position, the spring pushes the securing portion 18 and the securing axis 19 upwards at one side, to the left in the figure, of the pivotal pin 7. The counter portion 8 is then pushed downward on the other, right, side of the pivotal pin 7 into the recess 15 in the body portion 20. This is due to the distance between the counter portion 8 and the securing axis 19 provided by the securing portion 18. Thereby, the grip portion 3 is protruding away from the body portion 20 and is held in that position by the spring 17. The torque needed for moving the pivotal member 6 passed the threshold position towards the protruding position is set by the spring force in the spring 17. Also the position of the threshold position between the retracted position and the protruding position may be set by the arrangement of the spring 17 and the securing portion 18.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A closure device for closing a refill opening of a fuel tank, which closure device comprises:

a body portion for engagement with said refill opening, defines a longitudinal axis;

a pivotal member including a grip portion, which pivotal member is pivotal about a pivotal axis and pivotally connected to said body portion for movement between a retracted position and a protruding position, in which protruding position said grip portion extends outwardly of said body portion to form a grip and thereby assist in loosening and tightening the closure device, wherein the pivotal member is lockable in the protruding position by means of a holding member, wherein a first part of the holding member is secured to the pivotal member and a second part of the holding member is secured to the body portion, and wherein the closure device further comprises a biasing member arranged for urging the pivotal member towards the retracted position, wherein the pivotal member includes a counter portion located on an opposite side of said pivotal axis in relation to the grip portion, and the body portion has a recess portion for receiving the counter portion when the pivotal member is moved from the retracted position towards the protruding position.

2. A closure device according to claim 1, wherein said holding member comprises a first fastening member attached to the pivotal member and a second fastening member attached to the body portion, the first and second fastening members are adapted to engage each other when the pivotal member is in the protruding position.

3. A closure device according to claim 1, wherein said holding member is a resilient member.

4. A closure device according to claim 3, wherein a threshold position is arranged between the retracted position and the protruding position of the pivotal member and for a position of the pivotal member between said threshold position and the protruding position, the resilient member urges the pivotal member towards the protruding position.

5. A closure device according to claim 4, wherein said resilient member is a spring attached in one end to the pivotal member and in another end to the body portion.

6. A closure device according to claim 4, further comprising a conical pressure spring, the conical pressure spring being configured to act as both the biasing member and the resilient member, and for a position of the pivotal member between said threshold position and said retracted position, the conical pressure spring urges the pivotal member towards the retracted position.

7. A closure device according to claim 1, wherein the pivotal member is pivotal about or with at least one pin, which at least one pin is secured to the body portion, wherein the biasing member is a torsion spring arranged around said at least one pin for urging the pivotal member to return to the refracted position.

8. A closure device according to claim 1, wherein the first part of the resilient member is pivotally secured to a securing portion of the pivotal member, which securing portion projects into the interior of the body portion for the retracted position of the pivotal member.

9. A closure device according to claim 1, wherein at least a part of the pivotal member is provided with a surface structure on a surface of the pivotal member facing away from the body portion, which surface structure preferably includes grooves, recesses or ribs.

10. A closure device for closing a refill opening of a tank in a handheld power tool, which closure device comprises:

a body portion for engagement with said refill opening, which body portion defines a longitudinal axis;

a pivotal member including a grip portion, which pivotal member is pivotal about a pivotal axis and pivotally connected to said body portion for movement between a retracted position and a protruding position, in which protruding position said grip portion extends outwardly of said body portion to form a grip and thereby assist in loosening and tightening the closure device, wherein the pivotal member is lockable in the protruding position by means of a holding member, wherein a first part of the holding member is secured to the pivotal member and a second part of the holding member is secured to the body portion, and wherein the closure device further comprises a biasing member arranged for urging the pivotal member towards the retracted position, wherein said holding member is a resilient member, wherein a threshold position is arranged between the retracted position and the protruding position of the pivotal member and for a position of the pivotal member between said threshold position and the protruding position, the resilient member urges the pivotal member towards the protruding position, and wherein the resilient member is a conical pressure spring.

11. A closure device for closing a refill opening of a tank in a handheld power tool, which closure device comprises:

a body portion for engagement with said refill opening, which body portion defines a longitudinal axis;

a pivotal member including a grip portion, which pivotal member is pivotal about a pivotal axis and pivotally connected to said body portion for movement between a retracted position and a protruding position, in which protruding position said grip portion extends outwardly of said body portion to form a grip and thereby assist in loosening and tightening the closure device, wherein the pivotal member is lockable in the protruding position by means of a holding member, wherein a first part of the holding member is secured to the pivotal member and a second part of the holding member is secured to the body portion, and wherein the closure device further comprises a biasing member arranged for urging the pivotal member towards the retracted position, and wherein the pivotal member includes a counter portion located on an opposite side of said pivotal axis in relation to the grip portion, and the body portion has a recess portion for receiving the counter portion when the pivotal member is moved from the retracted position towards the protruding position.

12. A closure device according to claim 11, wherein the counter portion is configured such that it may be pressed down so as to assist in moving the pivotal member away from the retracted position.

13. A closure device according to claim 11, wherein at least a part of the counter portion protrudes a distance beyond the surrounding surface of the body portion in the direction of the longitudinal axis when the pivotal member is in the retracted position.

14. A closure device according to claim 11, wherein the grip portion extends a distance A from the pivotal axis and the counter portion extends at least a distance 0.25×A from the pivotal axis.

*15. A closure device for closing a refill opening of a tank in a handheld power tool, the closure device comprising:*

*a body portion for engagement with the refill opening, wherein the body portion defines a longitudinal axis; and*

*a pivotal member comprising a grip portion, wherein the pivotal member is pivotal about a pivotal axis and pivotally connected to the body portion for movement between a retracted position and a protruding position, in which protruding position the grip portion extends outwardly of the body portion to form a grip and thereby assist in loosening and tightening the closure device,*

*wherein the pivotal member is lockable in the protruding position by a holding member, wherein a first part of the holding member is secured to the pivotal member,*

*wherein the pivotal member comprises a counter portion located on an opposite side of the pivotal axis in relation to the grip portion, and the body portion comprises a recess portion for receiving the counter portion when the pivotal member is moved from the retracted position towards the protruding position, and*

*wherein a threshold position is arranged between the retracted position and the protruding position of the pivotal member, and for a position of the pivotal member between the threshold position and the protruding position, the holding member urges the pivotal member towards the protruding position.*

*16. The closure device of claim 15, wherein the counter portion is configured such that it may be pressed down so as to assist in moving the pivotal member away from the retracted position.*

*17. The closure device of claim 15, wherein at least a part of the counter portion protrudes a distance beyond a surrounding surface of the body portion in a direction of the longitudinal axis when the pivotal member is in the retracted position.*

*18. The closure device of claim 15, wherein the grip portion extends a distance A from the pivotal axis, and wherein the counter portion extends at least a distance 0.25×A from the pivotal axis.*

*19. The closure device of claim 15, wherein the holding member comprises a spring.*

*20. The closure device of claim 15, wherein the holding member is pivotally secured to a securing portion of the pivotal member, and wherein the securing portion projects into the interior of the body portion for the retracted position of the pivotal member.*

*21. The closure device of claim 15, wherein at least a part of the pivotal member is provided with a surface structure on a surface of the pivotal member facing away from the body portion.*

*22. A closure device for closing a refill opening of a tank of a handheld power tool, the closure device comprising:*

*a body portion configured to engage the refill opening;*

*a pivotal member pivotally connected to the body portion and configured to pivot about a pivotal axis between a retracted position and a protruding position, wherein the pivotal member comprises a grip portion, and wherein, when the pivotal member is in the protruding position, the grip portion extends away from the body portion to form a grip for loosening or tightening the closure device relative to the refill opening; and*

*a resilient member extending between the body portion and the pivotal member and configured to hold the pivotal member in the protruding position,*

*wherein the pivotal member comprises a counter portion, and wherein the counter portion is located on an opposite side of the pivotal axis relative to the grip portion, and*

*wherein the body portion comprises a recess portion, and wherein the recess portion is configured to receive the counter portion when the pivotal member is in the protruding position.*

*23. The closure device of claim 22, wherein the counter portion is configured to be pressed into the recess portion so as to assist in moving the pivotal member away from the retracted position.*

*24. The closure device of claim 22, wherein the pivotal member is configured to pivot from the retracted position to a threshold position and then to the protruding position, and wherein, when the pivotal member is between the threshold position and the protruding position, the resilient member urges the pivotal member towards the protruding position.*

*25. The closure device of claim 24, wherein, when the pivotal member is between the threshold position and the retracted position, the resilient member urges the pivotal member towards the retracted position.*

*26. The closure device of claim 22, wherein the resilient member comprises a spring.*

*27. The closure device of claim 26, wherein the spring comprises a conical pressure spring.*

*28. The closure device of claim 22, wherein the pivotal member comprises a securing portion, wherein the resilient member is pivotally secured to the securing portion, and wherein, when the pivotal member is in the retracted position, the securing portion projects into the recess portion.*

*29. The closure device of claim 22, wherein the pivotal member comprises a securing portion, wherein the resilient member is pivotally secured to the securing portion at a securing axis, and wherein the securing axis is substantially parallel to the pivotal axis.*

*30. The closure device of claim 29, wherein the grip portion is integral with the counter portion, and wherein the counter portion is integral with the securing portion.*

*31. The closure device of claim 22, wherein the pivotal member comprises a surface structure that faces away from the body portion.*

*32. The closure device of claim 22, wherein the body portion defines a longitudinal axis, and wherein the pivotal axis is substantially perpendicular to the longitudinal axis.*

*33. The closure device of claim 22, wherein the body portion comprises threads configured to engage corresponding threads on the refill opening.*

*34. The closure device of claim 22, wherein the grip portion comprises a semi-circular shape.*

*35. The closure device of claim 22, wherein the pivotal member comprises a recess formed in the periphery of the grip portion, and wherein the recess is configured to receive a finger tip of an operator of the handheld power tool so as to assist in moving the pivotal member away from the retracted position.*

*36. The closure device of claim 22, further comprising a sealing ring engaged with the body portion and made of an elastic rubber material.*

*37. The closure device of claim 22, wherein the resilient member is pivotally secured to the pivotal member and secured within an interior of the body portion.*

*38. The closure device of claim 22, wherein the grip portion extends a distance A from the pivotal axis, and wherein the counter portion extends at least a distance 0.25×A from the pivotal axis.*

*39. A handheld power tool comprising the closure device of claim 22, wherein the handheld power tool comprises a chainsaw.*

*40. The handheld power tool of claim 39, wherein the tank comprises a lubricant tank.*

* * * * *